United States Patent
Deegan et al.

(10) Patent No.: US 9,382,144 B2
(45) Date of Patent: Jul. 5, 2016

(54) HAZARDOUS WASTE TREATMENT PROCESS

(75) Inventors: David Deegan, Bampton Oxford (GB); Chris Chapman, Nr. Fairford Glouc (GB); Saeed Ismail, Swindon (GB)

(73) Assignee: Tetronics (International) Limited, Swindon (GB)

( * ) Notice: Subject to any disclaimer, the term of this patent is extended or adjusted under 35 U.S.C. 154(b) by 1233 days.

(21) Appl. No.: 12/293,799

(22) PCT Filed: Mar. 20, 2007

(86) PCT No.: PCT/GB2007/001017
§ 371 (c)(1),
(2), (4) Date: Dec. 8, 2009

(87) PCT Pub. No.: WO2007/107760
PCT Pub. Date: Sep. 27, 2007

(65) Prior Publication Data
US 2010/0078409 A1    Apr. 1, 2010

(30) Foreign Application Priority Data

Mar. 20, 2006 (GB) .................................. 0605570.1
Jan. 5, 2007 (GB) .................................. 0700205.8

(51) Int. Cl.
*B23K 10/00* (2006.01)
*C03B 5/02* (2006.01)
(Continued)

(52) U.S. Cl.
CPC ................ *C03B 5/025* (2013.01); *B09B 3/005* (2013.01); *B09B 3/0066* (2013.01); *C03B 5/005* (2013.01); *C04B 33/13* (2013.01); *C04B 33/132* (2013.01); *C04B 33/1325* (2013.01);
(Continued)

(58) Field of Classification Search
CPC ........................................................ B23K 10/00
USPC ........................... 219/121.36, 121.37, 121.38
See application file for complete search history.

(56) References Cited

U.S. PATENT DOCUMENTS 4,521,890 A    6/1985    Burnham et al.
4,685,963 A    8/1987    Saville
(Continued)

FOREIGN PATENT DOCUMENTS

EP    0305131    3/1989
EP    0625869    11/1994
(Continued)

OTHER PUBLICATIONS

Walter Heep, et al; The ZWILAG Incinerator and Melting Furnace; Proceedings of Global 2005, Tsukuba, Japan, Oct. 9-13, 2005; Paper No. 016 (7 pgs).
(Continued)

*Primary Examiner* — Dana Ross
*Assistant Examiner* — Ayub Maye
(74) *Attorney, Agent, or Firm* — Senniger Powers LLP

(57) ABSTRACT

A method for treating hazardous waste comprising the steps of providing a plasma reactor, waste to be treated and a glass-forming host slag material; contacting within the plasma reactor the waste and the host slag material; and treating the waste and the host slag material using a plasma treatment to melt the host slag material and incorporate inorganic components of the waste within the host slag material, wherein the plasma is generated using an arc and the arc is passed through the host slag material.

20 Claims, 10 Drawing Sheets

(51) Int. Cl.
  *B09B 3/00* (2006.01)
  *C03B 5/00* (2006.01)
  *C04B 33/13* (2006.01)
  *C04B 33/132* (2006.01)
  *C04B 33/32* (2006.01)
  *G21F 9/30* (2006.01)
  *H05H 1/48* (2006.01)

(52) U.S. Cl.
  CPC ......... *C04B 33/1328* (2013.01); *C04B 33/323* (2013.01); *G21F 9/305* (2013.01); *H05H 1/48* (2013.01); *C04B 2235/3208* (2013.01); *Y02P 40/52* (2015.11); *Y02P 40/69* (2015.11)

(56) References Cited

U.S. PATENT DOCUMENTS

| | | | |
|---|---|---|---|
| 4,729,421 A | | 3/1988 | Schatz |
| 5,281,790 A | * | 1/1994 | Nguyen Handfield et al. ............ 219/121.38 |
| 5,606,925 A | | 3/1997 | Boen et al. |
| 5,666,891 A | * | 9/1997 | Titus et al. ............ 110/250 |
| 5,798,497 A | * | 8/1998 | Titus et al. ............ 219/121.37 |
| 5,943,970 A | * | 8/1999 | Gonopolsky ............ C10B 53/00 110/203 |
| 6,066,825 A | * | 5/2000 | Titus et al. ............ 219/121.36 |
| 6,532,768 B1 | | 3/2003 | Labrot et al. |
| 7,465,843 B2 | * | 12/2008 | Gnedenko et al. ............ 585/242 |
| 2003/0039297 A1 | | 2/2003 | Wittle |
| 2005/0120754 A1 | * | 6/2005 | Girold et al. ............ 65/DIG. 4 |
| 2006/0144305 A1 | * | 7/2006 | Vera ............ 110/250 |

FOREIGN PATENT DOCUMENTS

| | | | |
|---|---|---|---|
| EP | 0627388 | 12/1994 | |
| EP | 0647598 | 4/1995 | |
| EP | 0837041 | 4/1998 | |
| EP | 1589121 | 10/2005 | |
| WO | 9504004 | 2/1995 | |
| WO | WO 9504004 A1 * | 2/1995 | ............ C03B 5/02 |
| WO | 2004036117 | 4/2004 | |
| WO | 2007107760 | 9/2007 | |

OTHER PUBLICATIONS

International Search Report and Written Opinion issued in related International Patent Application No. PCT/GB2007/001017 dated Jun. 22, 2007.

British Search Report issued in related Application No. GB0605570.1 dated Jul. 27, 2006.

International Preliminary Report on Patentability issued in related International Patent Application No. PCT/GB2007/001017 dated Jul. 4, 2008.

* cited by examiner

Inner water-cooling channel 3A

HAZARDOUS WASTE TREATMENT PROCESS

The present invention relates to a method of treating waste, particularly waste containing harmful substances such as radioactive materials and/or hazardous waste components such as asbestos. Hazardous waste includes a material contaminated with radionuclides or hazardous materials at concentrations or activities in excess of the regulator thresholds.

Since the operation of the first nuclear power plants there has been a need to safely dispose of waste that contains radioactive materials. Radioactive waste materials which need to be disposed of may also be produced in other industrial environments, such as hospitals, research establishments, decommissioning of nuclear power stations and in industry. The waste materials can arise from operational sources or during decommissioning activities. Such waste may be in the form of metal, soil, building rubble and organic materials such as paper towels, clothing and general laboratory equipment.

Recent developments for disposing of hazardous wastes include in-drum pyrolysis processes, such as that disclosed in the patent publication WO 2004/036117. This document discloses a process that involves pyrolysis and then steam reforming of waste containing organic materials and radionuclides, i.e. radioactive materials. The pyrolysis volatises the organic materials within the drums at a temperature of between 200° C.-800° C. The resulting solid material remaining in the drums after the pyrolysis is a dry, inert inorganic matrix, which contains the radionuclides and their compounds. This inert inorganic matrix has a high carbon content, indicating the active form of the residues and ineffectiveness of the thermal treatment. The remaining species in the gaseous phase following pyrolysis are water vapour, volatised organics and acid gases, which then are fed to a steam reformer, which operates at a temperature of 800° C. to 1000° C. This process is only of use for waste which is contained in drums and can only be carried out in a batch-wise operation. The drum material provides a barrier between a user handling the waste and the radioactive materials contained within the solid product material in the drum. However, it is not convenient to treat all waste in drums. Additionally, the present inventors have found that the final solid product produced with the in-drum process does not form a satisfactory physical and chemical barrier to radionuclides contained within the solid product as it forms a product that can be described as a clinker (fused at the edges), as opposed to a dense slag. This means that the hazardous components of the waste offer the potential to be mobilised.

US patent publication US 2005/0120754 discloses a method for the plasma treatment of radioactive waste in a stainless steel crucible. The method involves passing an electrical arc between two plasma torches in an oxygen containing atmosphere. The arc may pass through the oxygen atmosphere or through the waste being treated. While this process does to an extent achieve its aims of being able to incinerate combustible materials and vitrify certain types of waste (e.g. ion exchange resins contaminated with radioactive materials on a glass in the nepheline family), there are a number of drawbacks. Firstly, it would seem to be limited to batch-wise treatment of the waste. It would also appear to be limited to waste that would itself vitrify under plasma conditions (form a stable glassy slag without material addition or the use of a host material repository). Not all hazardous or radioactive waste, of course, will, on its own, vitrify (for example—highly combustible waste, such as paper that has radioactive particles on its surface). The present inventors also found that a plasma process is highly corrosive and will degrade the exposed interior surfaces of a metal crucible during plasma treatment. Here the high chlorine content attributed to the use of PVC would lead to stress corrosion cracking of the plasma devices. The present inventors also believe that the process disclosed in US 2005/0120754 could be adapted so that it operated more efficiently.

In the proceedings of GLOBAL 2005, held at Tsukuba, Japan, on Oct. 9-13, 2005, (Paper No. 016) a process for treating low and intermediate level nuclear waste in an incinerator and melting furnace was disclosed. The process involved the incineration of the waste in a plasma furnace that had a centrifuge chamber. When the waste was loaded into the plasma furnace, the centrifuge would force the waste to the sides of the rotating walls of the chamber. On initiating the plasma furnace, the waste melts and runs towards the centre of the furnace floor and exits the chamber through an outlet in the floor into a mould beneath the outlet. The design of the chamber is complex and difficult to service, which presents health and safety risks. The process also results in a large amount of offgas containing many contaminants, which must be treated in a separate part of the apparatus. The offgas treatment is an expensive and energy-consuming process.

It is an aim of the present invention to overcome or mitigate the problems associated with the prior art.

The present invention provides a method for treating hazardous waste comprising:
  providing a plasma reactor, waste to be treated and a glass-forming host slag material;
  contacting within the plasma reactor the waste and the host slag material; and
  treating the waste and the host slag material using a plasma treatment to melt the host slag material and incorporate inorganic components of the waste within the host slag material,
wherein the plasma is generated using an arc and the arc is passed through the host slag material.

The present invention also provides a method for treating hazardous waste comprising:
  providing a plasma reactor, waste to be treated and a host slag material containing $SiO_2$, $CaO$ and $Al_2O_3$;
  contacting within the plasma reactor the waste and the host slag material; and
  treating the waste and the host slag material using a plasma treatment to melt the host slag material and incorporate non-combustible components of the waste within the host slag material. The host slag material may further contain MgO, preferably 15% by weight or less of MgO.

The present invention will be illustrated with reference to the accompanying drawings, in which.

Figure 5:
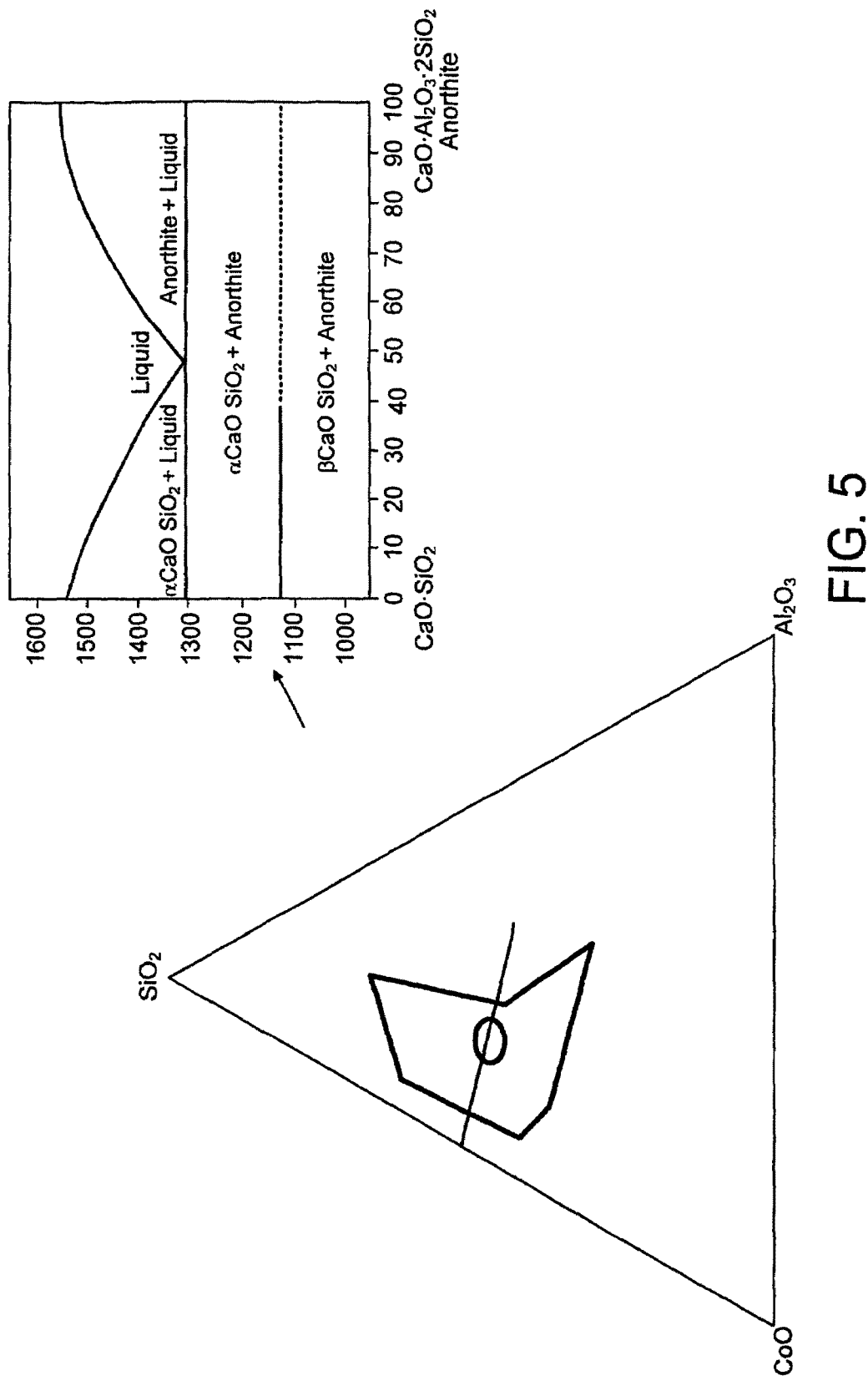

FIG. 5 shows (i) a three-component phase diagram of a material containing primarily CaO, $Al_2O_3$ and $SiO_2$, where the dark irregular shaped area marks a region of preferred compositions, those being particularly preferred being marked by an oval shape and (ii); indicated by an arrow, a two-component phase diagram for the two components $CaO.SiO_2$ and $CaO.Al_2O_3.2SiO_2$ (Anorthite), showing the phases present at different temperatures.

Figure 6:
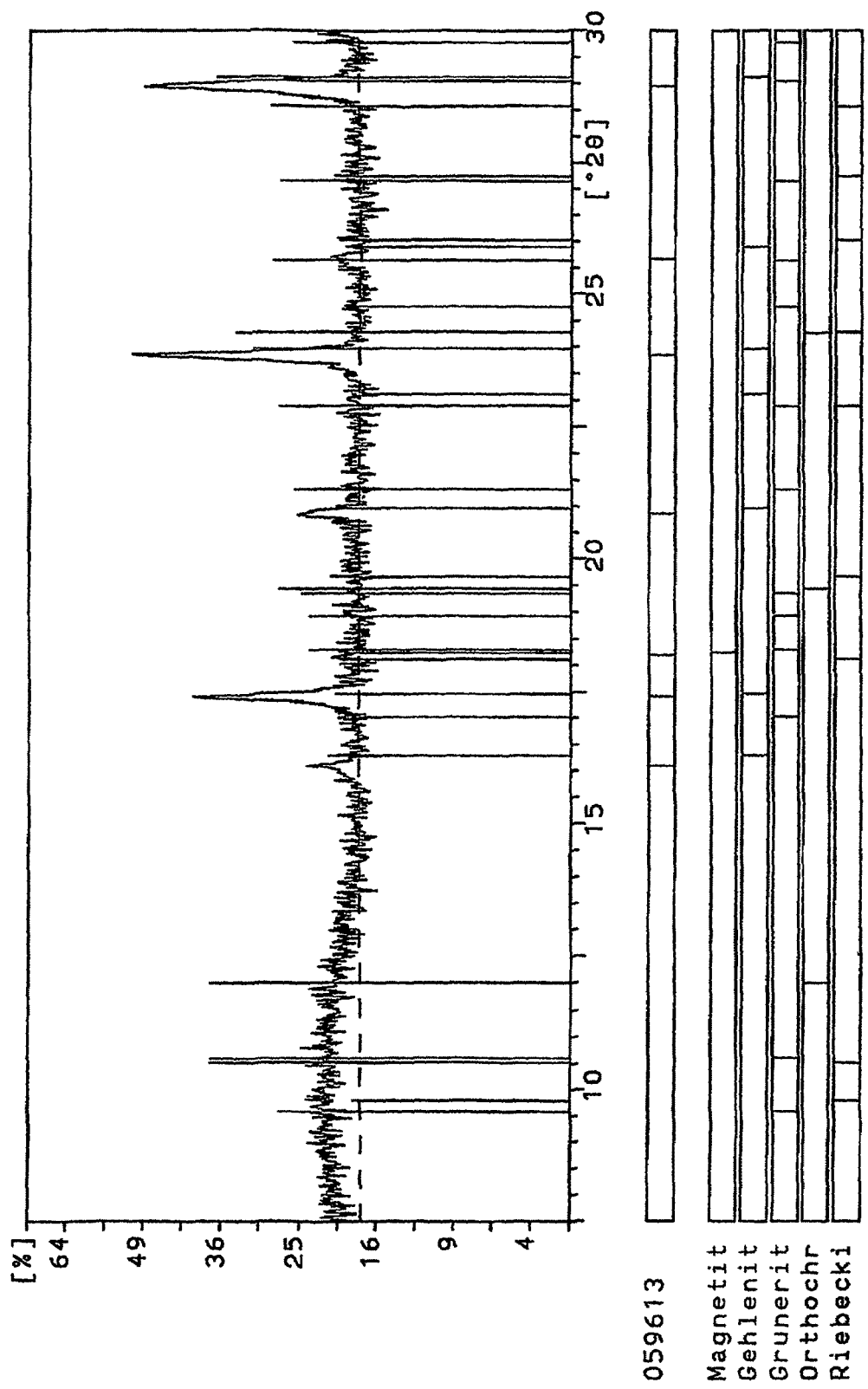

FIG. 6 shows an XRD diffractogram for a sample of a product slag material formed from the plasma treatment of a host slag material and an asbestos-containing waste material according to the present invention. The product slag material contains no characteristic peaks for asbestos, indicating that no asbestos is present.

Figure 7A:
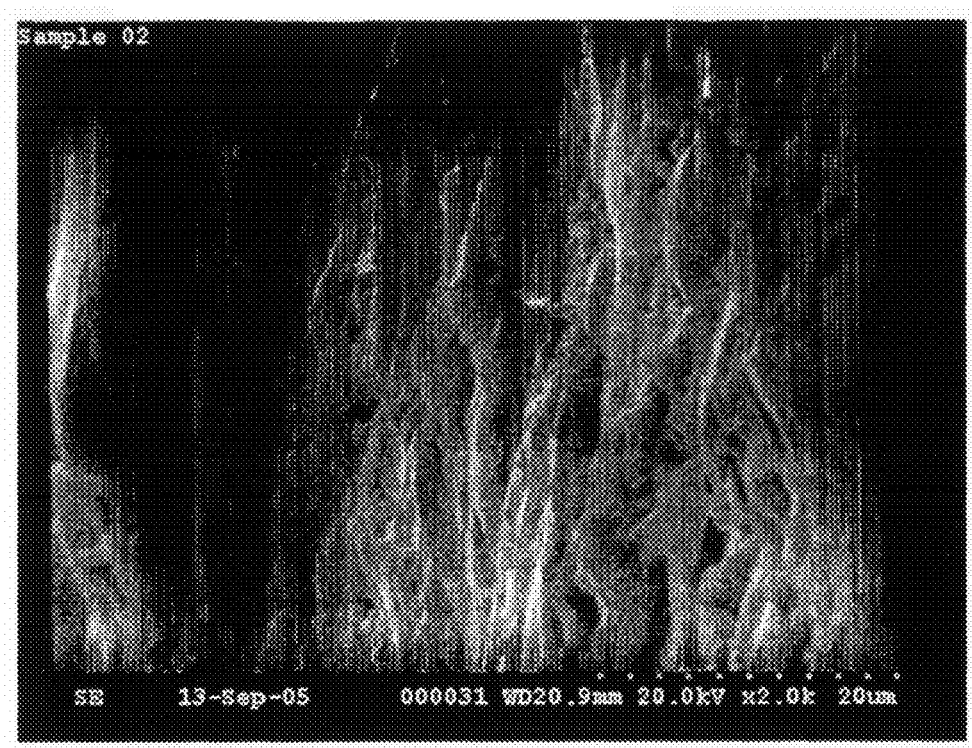
Figure 7B:
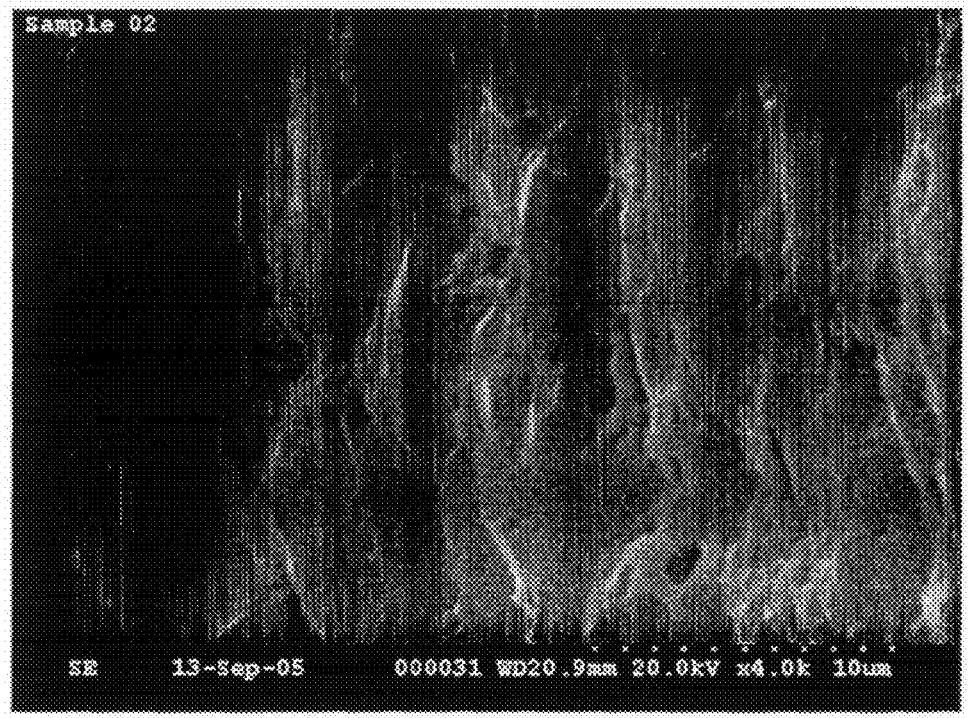

FIGS. 7a and 7b show SEM micrograph at 2000× and 4000× magnification, respectively, of a broken vertical edge of product slag material formed from the plasma treatment of a host slag material and an asbestos-containing waste material according to the present invention. No fibrous material, i.e. asbestos, is present.

Figure 8A:
Figure 8B:
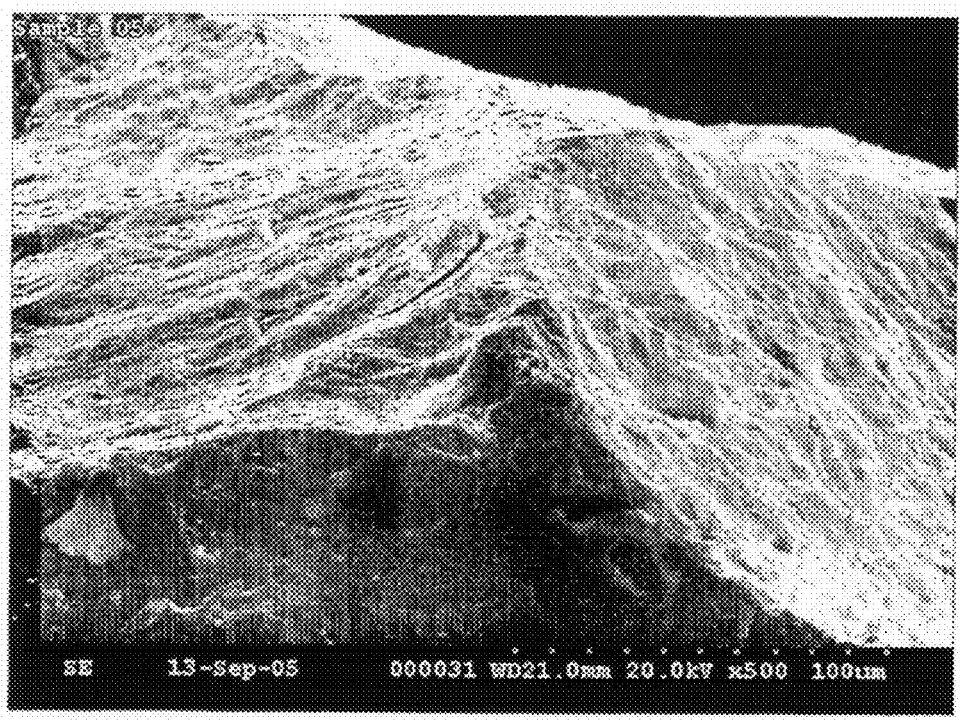

FIGS. 8a and 8b show SEM micrograph at 2000× and 500× magnification, respectively, of a horizontal and vertical edge of product slag material formed from the plasma treatment of a host slag material and an asbestos-containing waste material according to the present invention. Again, no fibrous material, i.e. asbestos, is present.

Figure 9:
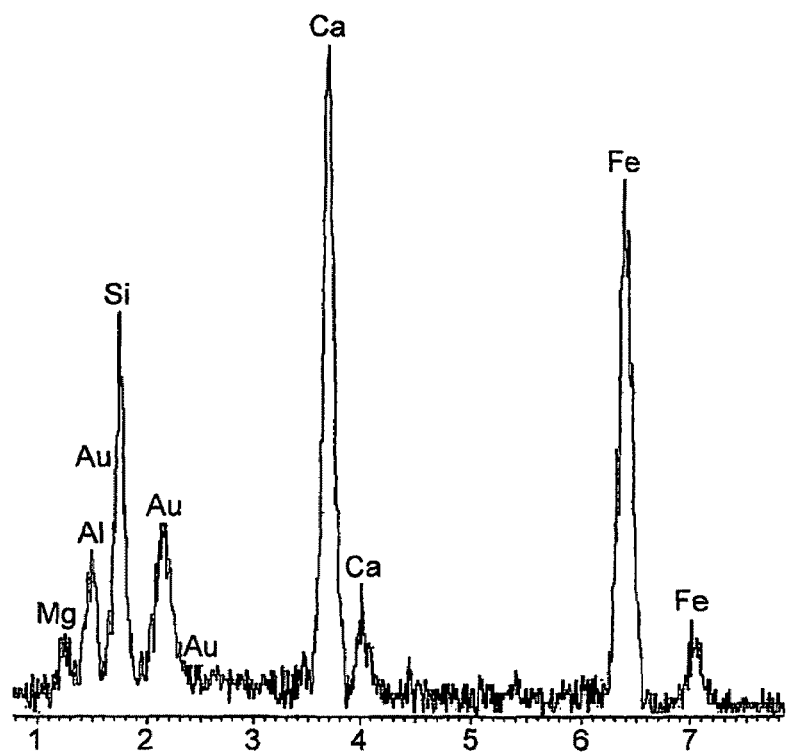
Figure 10:
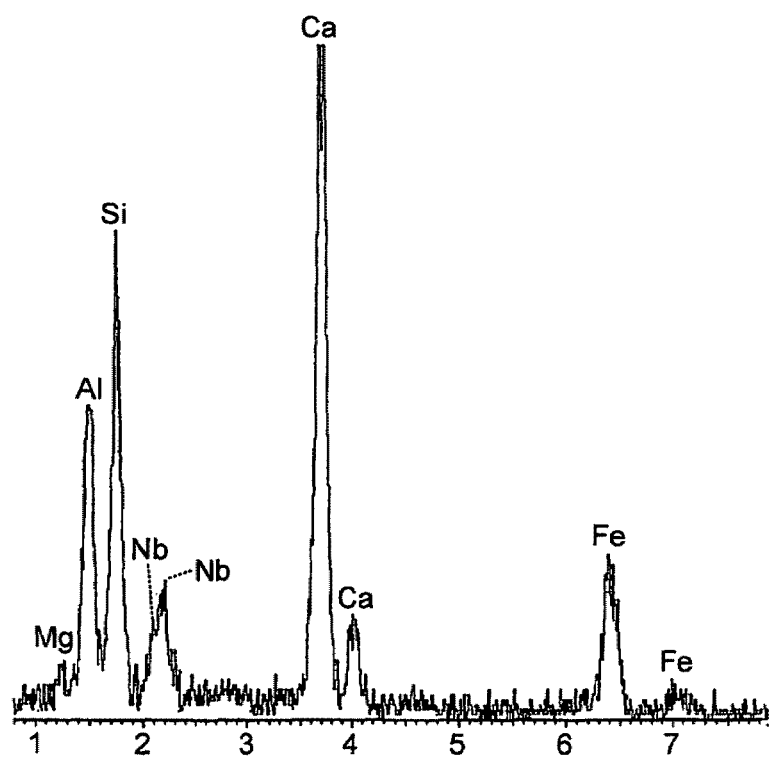

FIGS. 9 and 10 show EDX analysis of product slag material formed from the plasma treatment of a host slag material and an asbestos-containing waste material according to the present invention. These Figures show that the slag product contained calcium, silicon, iron, aluminium and magnesium, the last of which derived from the asbestos-containing material.

Figure 11:
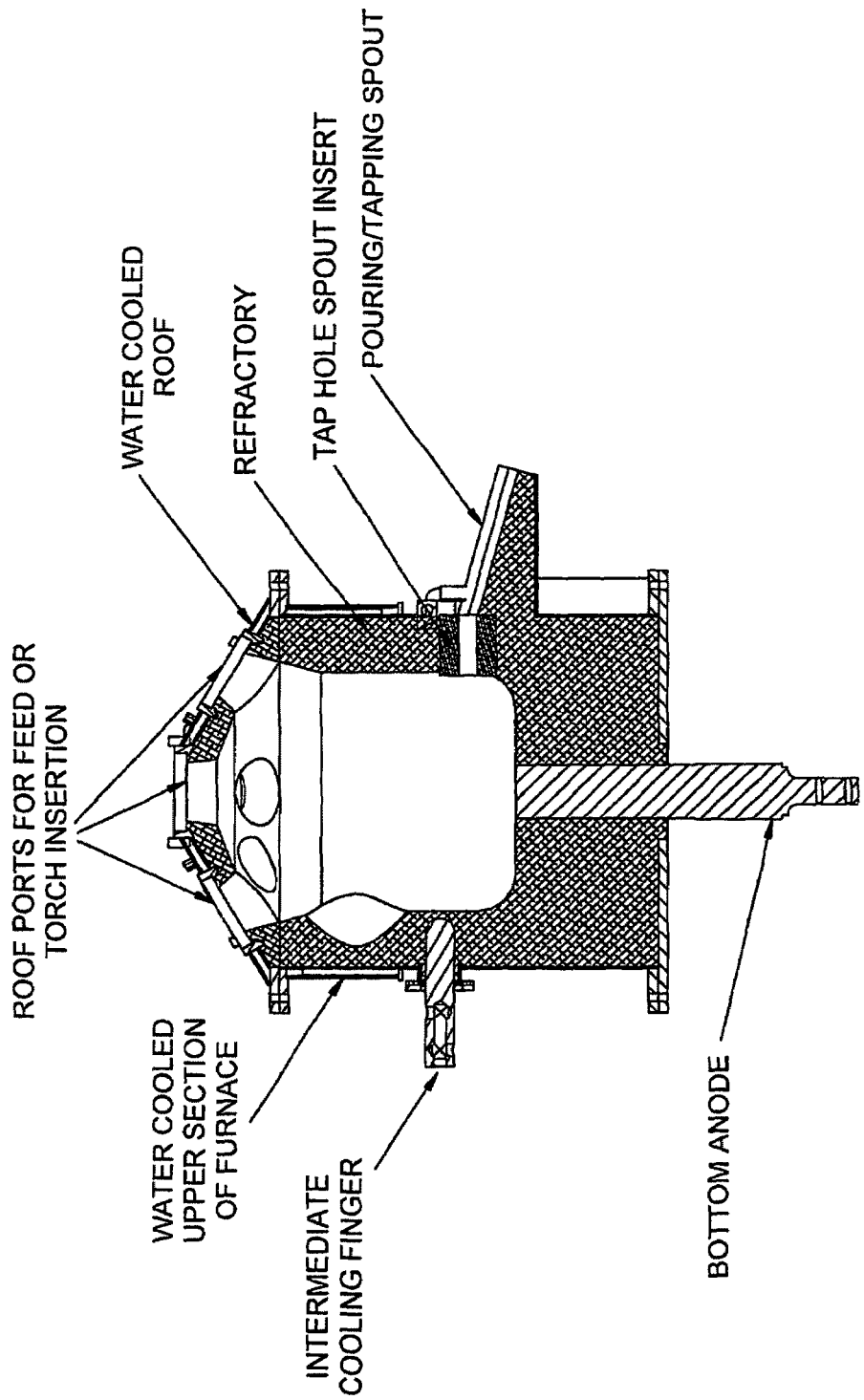

FIG. 11 shows a refractory-lined plasma furnace (plasma reactor), for use in the method of the present invention, having a single tap hole for intermittent slag removal from the interior of the furnace.

Figure 12:
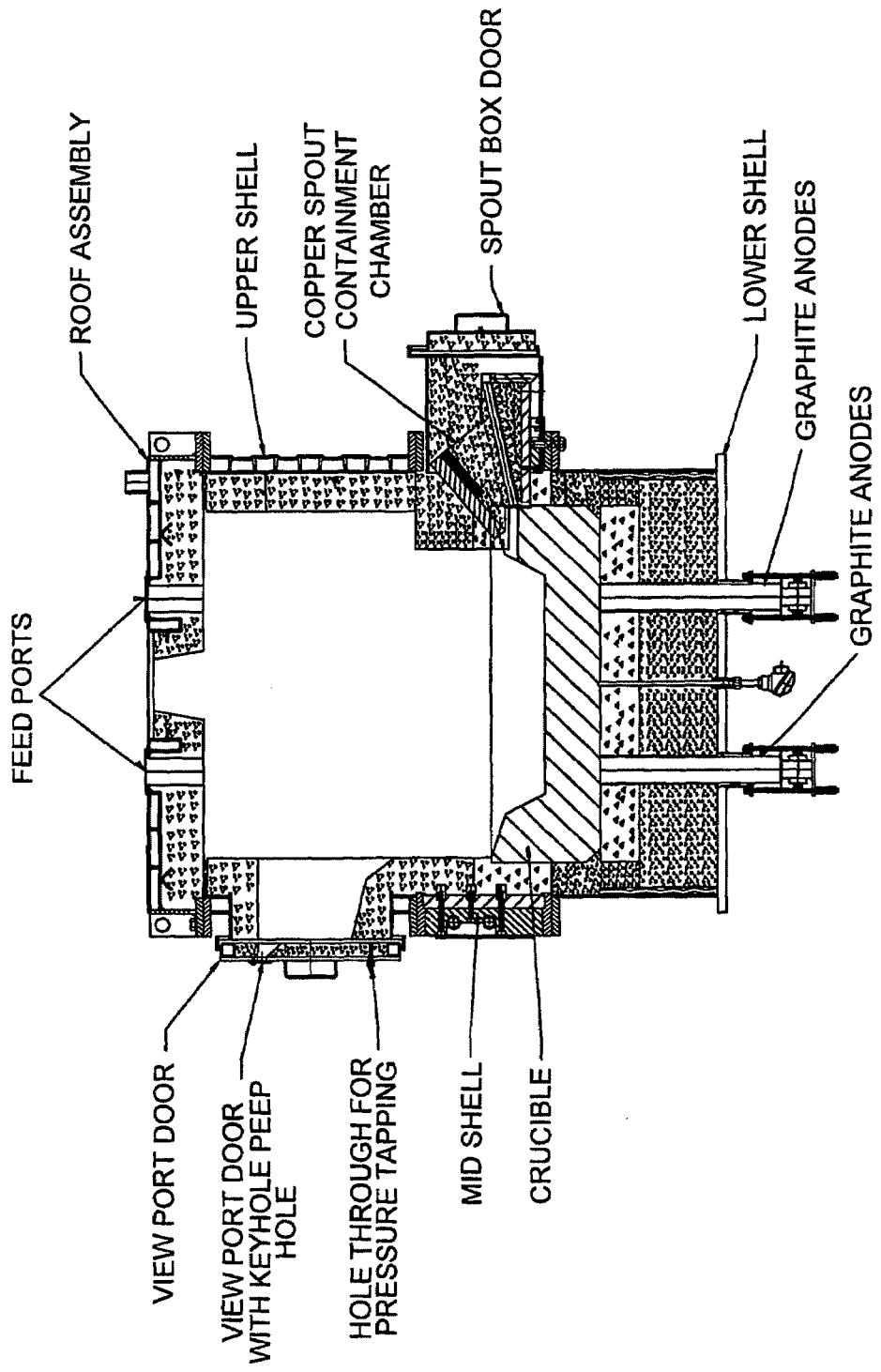

FIG. 12 shows a refractory-lined plasma furnace, for use in the method of the present invention, having a continuous overflow spout and graphite containment crucible.

The present invention will now be further described. In the following passages and claims different aspects of then invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

The present inventors have found that using a glass-forming host slag material, particularly one containing $SiO_2$, $Al_2O_3$, and one or both of CaO and MgO, allows the plasma treatment process to be used in treating heterogeneous waste. For instance, the waste may contain many different types of components, both combustible and non-combustible, organic and inorganic and/or components of varying size and density. The method is also suitable for treating waste composed entirely or almost entirely of combustible material (i.e. non-vitrifying material). The method of the present invention has the advantage that the heat from the plasma gasifies the combustible waste, while inorganic (such as oxides and metals) and/or non-combustible waste is incorporated into the host slag material, which will form a solid vitrified mass (the product material) once the host slag material is allowed to cool. The method may be used to treat waste containing radioactive materials, since these are safely incorporated within the slag material, but the method is not limited to this type of waste; for instance, the method has been found to be successful in the treatment of hazardous wastes such as APC residue and asbestos-containing wastes. No asbestos is detectable in the final solid product of the method of the present invention when used to treat asbestos-containing materials. The waste may comprise various components such as one or more of metals, soil, building rubble and organic materials, such as paper items, clothing, organic liquids and materials such as plastics. The waste may comprise halogenated (e.g. chlorinated) compounds. The metal may be in the form of metal equipment or parts of equipment. The method of the present invention may be used to treat the above components when they have been contaminated with radioactive substances. Additionally, if the waste material contains non-volatile radionuclides, such as plutonium, and chlorinated compounds, it has been found that very small amounts, if any, of volatile chloride and oxychlorides species of these radionuclides (e.g. PuClO Plutonium(III) chloride oxide & PuCl3 (g) Plutonium(III) chloride) result from the method and nearly all, if not all, of the radionuclides reside in the host slag material and the resultant product material The present inventors have found that the method can be optimised by carefully selecting the composition of the glass-forming host slag material. The host slag material may comprise one or more components. "Glass forming" means that the host slag material will (in the absence of other material) melt and form a glass. In the presence of the waste, it will usually form a glass, although it may be partially crystalline. A glass is a material known in the art. It is a material that, when solid, is not crystalline.

Glasses are materials that have properties intermediate to those of crystalline solids and liquids of the same composition. The structure lacks long-range periodic order, but typically exhibit some short-range order. No sharp phase transitions are noted on cooling, as in the case of the formation of crystalline phase materials or in phase transitions of state. One of the most important features of the glassy state is the isotropic nature of material properties. Glasses are usually obtained by cooling a liquid, below its freezing or liquidus temperature, at a sufficiently fast rate in order to avoid spontaneous crystallisation. Other externally imposed stimuli can result in similar transitions, e.g. pressure. Hence, glass formation is described through an understanding of cooling, heat transfer phenomena, material dimension and phase transformation kinetics. Materials that readily form glasses are usually those that are very viscous at the melting point and have complex structures that are difficult to re-arrange.

The host slag material preferably comprises a glass former and, optionally, an intermediate oxide and/or a network modifier. A 'glass former' is a material that can form a glass on its own (in the absence of other materials). They can be used to firm the backbone of any glass network, Preferred glass formers include, but are not limited to, $P_2O_5$ and $SiO_2$, most preferably $SiO_2$.

An 'Intermediate oxide' (sometimes termed a conditional glass formers) will participate in a glass network, in the presence of sufficient amounts of other oxides, but will not form one on its own. Preferred intermediate oxides include, but are not limited to, $V_2O_3$, $Bi_2O3$, $Al_2O_3$ and $MO_3$, wherein M is a transition metal (optionally selected from Cr, Mo and W), most preferably $Al_2O_3$.

A 'network modifier' typically disrupt the glassy network, increasing the incidence of non-bridging oxygen atoms. Preferred network modifiers include, but are not limited to CaO, MgO, Na$_2$O and K$_2$O. Preferably the network modifier comprises CaO and/or MgO.

The host slag material may, prior to melting, itself be or comprise a glass.

The host slag material may form, on melting, and subsequent solidification a silicate glass. For silicate glasses, viscous flow is thermally activated. The viscosity associated with the liquidus temperature is $1\times10^5$ poise and typically the viscosity associated with the glass transition region (Tg) is $1\times10^{13}$ poise.

Preferably, while the host slag material is molten during the method of the present invention, i.e. with liquidus temperatures up to 1600° C., cords (off composition glassy regions) and stones (refractory inclusions) are assimilated in the host slag material, bubbles escape and the composition becomes substantially homogenous. To achieve this effectively the host slag composition is tailored or selected to provide for sufficient fluidity at typical operating temperatures. Preferably, the host slag composition is selected such that the resultant molten glass formed at the operating temperature of the plasma reactor has a viscosity of 10 poise or less. Such operating temperatures may be of 1200° C. or above, typically 1300-1400° C., although higher temperatures may be used as described below. Preferably the operating temperature is 100° C. above the liquidus temperature of the host slag material. Enough glass formers are present to support the formation of a stable vitreous product, i.e. the final waste product. The composition is selected to make the process tolerant of slight compositional changes, i.e. there are no significant changes in liquidus temperature (approx 1300 deg C.) or viscosity upon slight variations in composition, and the final product is therefore ecological stable.

Preferably, the host slag material is heated to a temperature of 1300 to 1400° C. during the method such that, when molten at this temperature, it has a viscosity of 10 poise or less.

Preferably, the host slag material comprises SiO$_2$, Al$_2$O$_3$ and one or both of MgO and CaO.

Preferably, the host slag comprises 90% wt or less of SiO$_2$, more preferably 30 to 60 wt % SiO$_2$, more preferably 42 to 44 wt % SiO$_2$, most preferably about 43 wt % SiO$_2$. Preferably, the host slag comprises 70 wt % or less CaO, more preferably, 40 wt % or less CaO, still more preferably 20 to 35 wt % CaO, more preferably, 28 to 30 wt % CaO, most preferably about 29 wt % CaO. Preferably, the host slag material comprises 90 wt % or less Al$_2$O$_3$, more preferably 50 wt % or less Al$_2$O$_3$, still more preferably 20 to 40 wt % Al$_2$O$_3$, more preferably 26 to 29 wt % Al$_2$O$_3$, most preferably about 28 wt % Al$_2$O$_3$.

FIG. 5 shows a three component diagram for SiO$_2$, CaO and Al$_2$O$_3$. The contours shown on the diagram represent liquidus temperatures for the varied compositions. Preferably, the composition of the host slag material is selected, using the contours, such that the liquidus temperature of the composition is below 1700° C., more preferably below 1600° C., most preferably from 1100 to 1400° C. The host slag material preferably comprises a material comprising SiO$_2$, CaO and Al$_2$O$_3$ in the relative proportions shown in the (outer irregular shaped) boundary marked zone on the three-component phase diagram of FIG. 5, most preferably as shown in the oval shape on the diagram. These zones provides for a fluid that has a low viscosity when molten and a material having a relatively low liquidus temperature such that it can be molten at typical operational temperatures of a plasma reactor.

The host slag material may be a glass that contains the components mentioned herein in the proportions stated on a normalised oxide basis.

The preferred compositions of the host slag material have been found to form a product material that has few pores or cracks, if any. This is advantageous in treating hazardous and/or radioactive waste, since the hazardous material and/or radionuclides of the radioactive materials are incorporated entirely within the material and they have also been found to be evenly distributed throughout the material. The final product material formed from the preferred host slag material is preferably substantially homogenous. It has been found that large metallic objects, including radionuclide species such as plutonium, will be incorporated into the microstructure of the final product material, rather than simply being encapsulated within larger pores of the product material.

The method of the present invention was found to have advantages over the in-drum pyrolysis method mentioned above, since lower levels of residue carbon were achieved in the final waste product. If the method resulted in a solid material having a high carbon content (such as in the in-drum pyrolysis) this solid material would adversely alter the oxidation state of the melt and would also be environmentally mobile (result in high leaching characteristics) and would be mechanically disadvantageous for long term storage. Additionally, the solid product material of the present invention has a higher density than the in-drum product, and higher levels of oxidation of metals were achieved compared to the in-drum process, resulting in reduced metallic phase occurrence in the solid product material and higher levels of radioactive material retention in the solid product material when used to process radioactive waste.

Preferably, the host slag material comprises, in the solid phase, material within one or more of the compositional phase fields of gehlenite, pseudowolastonite and anorthite. Similar metastable phases are also to be expected, the ultimate microstructure being a function of composition processing regime and cooling regime.

The host slag material may comprise one or more magnesium-containing compounds, such as magnesium oxide. Preferably, the magnesium-containing material is present in an amount of 15 wt % or less.

The waste may constitute 80 wt % or less of the total amount of solid material in the plasma reactor, preferably 60 wt % or less, more preferably 50 wt % or less. Although it is possible to carry out the method of the present invention with a surprisingly high proportion of waste relative to the host slag material, it has been found that the resultant product material incorporates more of the original metallic species as oxides and is more uniform when the waste constitutes 50% or less of the solid material in the reactor.

Preferably, an oxidant is present within the plasma reactor. The oxidant may comprise oxygen gas and/or a component that is able to act as an oxidant such as water, saturated steam, superheated steam, air or mixtures thereof. Oxygen gas is preferred. Preferably, steam is also present in the plasma reactor to active any residue pyrolytic carbon through the formation of intermediate hydrocarbons and combustion gas species (ie CO and H$_2$). Typical oxidant flow rates are: gaseous O$_2$ at 4.5 to m$^3$ hr$^{-1}$ and 0.5 barg dry steam @ 7-8 kg/hr, which may be used for treating a waste at 7.5 kg/hr at 1600° C. The waste used in this example is 30-40% w/w organic, i.e. materials containing hydrocarbons, including hydrocarbonates, carbohydrates and halogenated hydrocarbons.

The present inventors have found that steam also reacts with the chlorinated organic species to form, inter alia, HCl.

The oxidant may be introduced into the plasma reactor either above the level of the host slag material and the waste or directly into the host slag material and the waste (the latter process sometimes being termed 'sparging' in the art). The oxygen, and optionally the steam, may be introduced directly into the host slag material by use of a porous refractory plug, or inlet components made from comprising clay-graphite or a refractory metal.

An advantage of using oxygen, and particularly an oxygen and steam combination, is that this has been found to more readily oxidise all elemental and metallic components present in the waste, thus improving its incorporation into the microstructure of the product material, i.e. the final wasteform.

Preferably, the waste and the host slag material are mechanically agitated during the plasma treatment. This will improve heat penetration and melt stirring due to buoyancy effects and produce uniform joule heating. In addition, the penetration of current into the melt and its subsequent divergence in favour of lower current densities has lead to the generation of Lorentz forces that will also improve stirring, this being a 'plasma effect'. Here the ability to reconfigure the plasma arc circuitry dynamically during the active processing period is preferably employed. Alternatively, a similar effect may be achieved by stirring the host slag material or by vibrational or other movement of the crucible that will promote mixing of the host slag material and the waste.

Preferably, the temperature of the host slag material during the plasma treatment is sufficiently high such that the host slag material is fluid, preferably sufficiently fluid to allow mixing of the host slag material with the waste and also sufficiently fluid to allow the host slag material to flow to the exterior of the chamber when required. Preferably, the temperature of the host slag material and the waste during the plasma treatment is higher than the liquidus temperature of the host slag material. Preferably, the temperature within the plasma reactor during the plasma treatment is 1500° C. or more, more preferably 1600° C. or more.

As is known to one skilled in the art, a plasma reactor comprises a crucible for holding the material to be treated, in this case the waste and the host slag material. Preferably, the crucible has a cooled internal wall. Preferably, the crucible has a cooling system for maintaining the internal wall of the crucible at a temperature below 100° C., irrespective of pressure, to avoid film boiling and maintain good heat transfer. Preferably, the cooling system is a water-cooling system, wherein preferably water is passed between an outer wall and an inner wall of the crucible in order to cool the inner wall. The crucible containment device can also be refractory lined with indirect water-cooling, i.e. remote water-cooling to the process with conductive heat transfer into the working environment to provide for the desired temperature profile. Alternatively, the plasma reactor may comprise a shell for holding the waste and the host slag material, the shell having a refractory-lined internal surface. For instance, the surface may have an internal covering of a refractory material such as alumina to improve energy efficiency.

Preferably, during the method of the present invention, the inner wall of the crucible is maintained below the liquidus, more preferably the solidus, temperature of the host slag material. (The liquidus and solidus temperatures of the host slag material are readily measured by one skilled in the art by routine experimentation.) This has been found to have a number of advantages. Firstly, the host slag material forms a solid coating on the interior surface of the crucible, protecting the material of the crucible from corrosion and hazardous or radiological contamination from the plasma environment. Additionally, it has been found that high temperatures can be reached, with high energy fluxes, within the plasma reactor because of the solid coating layer of host slag material, which has relatively low heat transfer properties or high thermal resistance. Preferably, the method involves first plasma treating the host slag material in the absence of waste, and with the internal surface of the crucible maintained at a temperature below the liquidus, more preferably solidus, temperature of the host slag material in order to form the solid interfacial coating of the material for containment, and subsequently adding the waste to the host slag material. This avoids incorporation of any hazardous materials present in the waste into the solid coating layer as the low temperature inhibits diffusional processes.

The plasma reactor may comprise one or two plasma torches and/or electrodes. If the plasma reactor comprises a single plasma torch or electrode, the crucible may act as a live component of system. Torches and electrodes are well known to those skilled in the art of plasma generation.

Preferably the plasma reactor comprises two plasma electrodes, which are preferably operable in one or both of the following modes: a first mode in which an electric arc is passed above the level of the host slag material (i.e. remotely coupled between the electrodes but remote from the host slag) and a second mode in which an electric arc is passed through the host slag material (i.e. directly coupled to the host slag material, i.e. transferred mode). The first mode allows the plasma process to be initiated while processing a ceramic material system, avoiding the need for a conductive hearth. The second mode allows ohmic heating of the host slag material. This means that the electrical current passes through the material undergoing treatment and therefore provides for a higher power input per unit current that is spatially distributed, i.e. two arc attachment points, with a high coupling efficiency.

The plasma electrodes may comprise any material suitable for the generation of an arc, as known to the skilled person, including, but not limited to graphite.

Preferably, the one or more plasma electrodes comprise graphite, which has been surprisingly found to be particularly durable when used in the method of the present invention and resistant to corrosive chemicals such as halogens. Preferably the electrodes are coated with alumina, which will give more consistent wear characteristics and minimise lateral electrode carbon losses due to the high temperature oxidising environment.

The present invention further provides an apparatus for the plasma treatment of waste comprising a plasma reactor having a crucible containing a host slag material, as defined herein, comprising $SiO_2$, CaO and $Al_2O_3$ and, optionally, magnesium oxide.

The present invention also provides an apparatus for the plasma treatment of waste in the presence of a host slag material, the apparatus comprising a plasma reactor having a crucible with a cooled internal surface, said apparatus operable to allow the generation of an arc that can pass through and melt the host slag material. The apparatus in itself need not contain the host slag material.

The plasma reactor may comprise an inlet for oxygen gas and optionally an inlet for steam. The inlet for oxygen and the inlet for steam may be adapted such that the oxygen and steam are mixed before or upon entry into the plasma reactor.

The inlet for oxygen and optionally the inlet for steam may be arranged such that the oxygen and optionally the steam enter the plasma reactor chamber through the host slag material.

Preferably, the apparatus is adapted such that the plasma power input and/or oxygen supply are controlled using automated control loops, rather than being set at predetermined levels throughout the treatment process. Here experimentation has indicated that a free oxygen concentration during the method of 15.7% v/v (or within the range of 14-17% v/v) has minimised the formation of soot and heavy hydrocarbon molecules and stabilised plasma operation. This was observed using Flame Ionisation Detection (FID). This value was measured after the point of secondary air injection, i.e. air to cool the gas stream after post combustion. The metered oxidant level therefore needs to modulate in response to the demands of the organic waste fraction. The reactor was assumed to operate at a temperature of 1600° C. with a material feed rate of waste of <10 kg hr$^{-1}$. The net or theoretical energy requirements (TER) were determined from specific heat and latent heats of transformation data. The gross energy requirement (GER) took into account the thermal losses of the reactor's structure, i.e. the energy conducted to the water-cooled elements and that retained in the off-gas stream. During operation the plasma power was maintained between 150-350 kW.

Preferably, the oxygen gas concentration in the gas within the plasma reactor is preferably 17% v/v or less, most preferably from 14 to 17% v/v. At the start of the plasma treatment of the waste, the oxygen concentration in the plasma reactor may be higher than 17% v/v, but during the process, the oxygen concentration is preferably brought within and then maintained within 14 to 17% v/v. The plasma reactor will include a plasma gas, such as argon. Other gases that may be present in the plasma reactor include nitrogen, steam, and gases produced from the treatment of the waste, such as carbon monoxide and/or carbon dioxide. Nitrogen may be present from the inlet of air, which may be used to cool the gas stream, if required.

Preferably, the plasma reactor is maintained at a power consumption rate of from 150 to 350 kW.

Preferably, the reactor comprises monitoring equipment, including, but not limited to equipment selected from: CCTV monitoring equipment for viewing the molten material within the plasma reactor, equipment for monitoring the amount of waste material and/or host slag material being fed to the reactor, equipment for monitoring the internal temperature of the plasma reactor and equipment for monitoring the internal pressure of the plasma reactor.

The apparatus may be operable using a sealed gravity feed mechanism. The apparatus may comprise a working upper chamber and a lower receptor chamber, wherein the upper chamber is adapted such that the molten slag material in the upper chamber can flow by gravity into the lower chamber. This is particularly advantageous in a continuous process, in which host slag material and waste are fed into the chamber continuously or periodically and avoids the requirement to run the process in a batch-wise manner. The upper and lower chambers are preferably sealed to prevent ingress of diatomic species into the plasma reactor from its exterior and egress of hazardous species. The host slag material and/or the waste may be fed to the reactor through an airlock device, which ensure positive displacement of the waste into the reactor, and prevents ingress or egress of gases and heat to/from the interior of the plasma reactor. Feed ports containing airlock devices are known to the skilled person. The product material in the lower chamber can be removed after solidification through an air-lock device.

The present invention will now be illustrated with the following non-limiting Example.

EXAMPLE

Figure 1A:
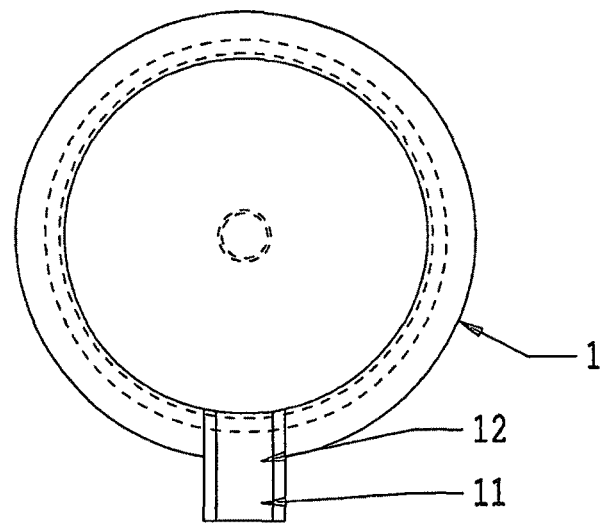
FIGS. 1a-1c show a crucible suitable for use in the method of the present invention, with 1a showing a plan view, 1b showing a cross section of the crucible, with cooling water channels shown between the inner and outer walls, and 1c showing a detail of the cross section in operation, i.e. with a cold skull in place.
Figure 1B:
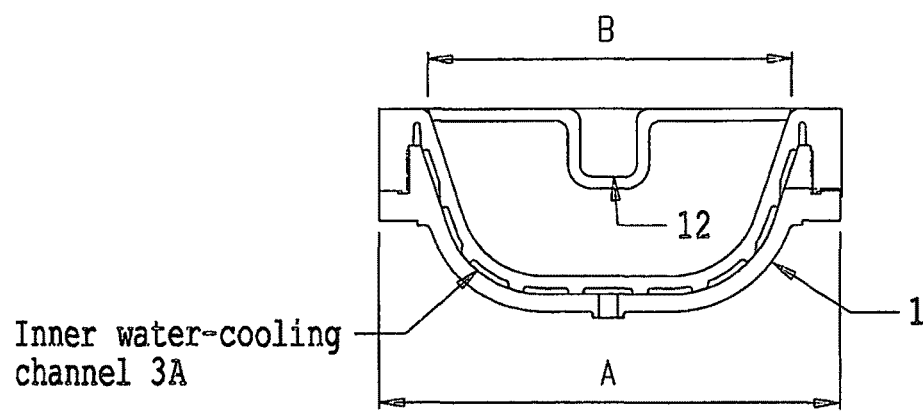
Figure 1C:
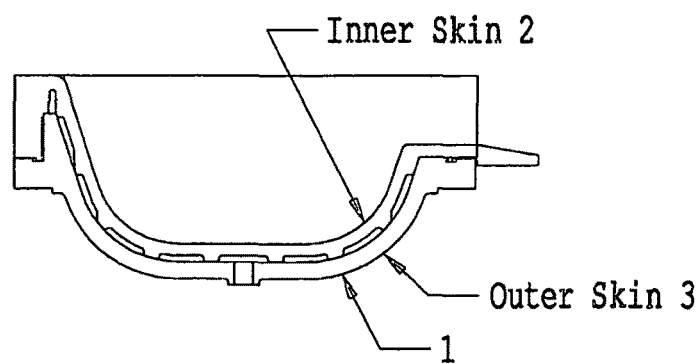
Figure 2:
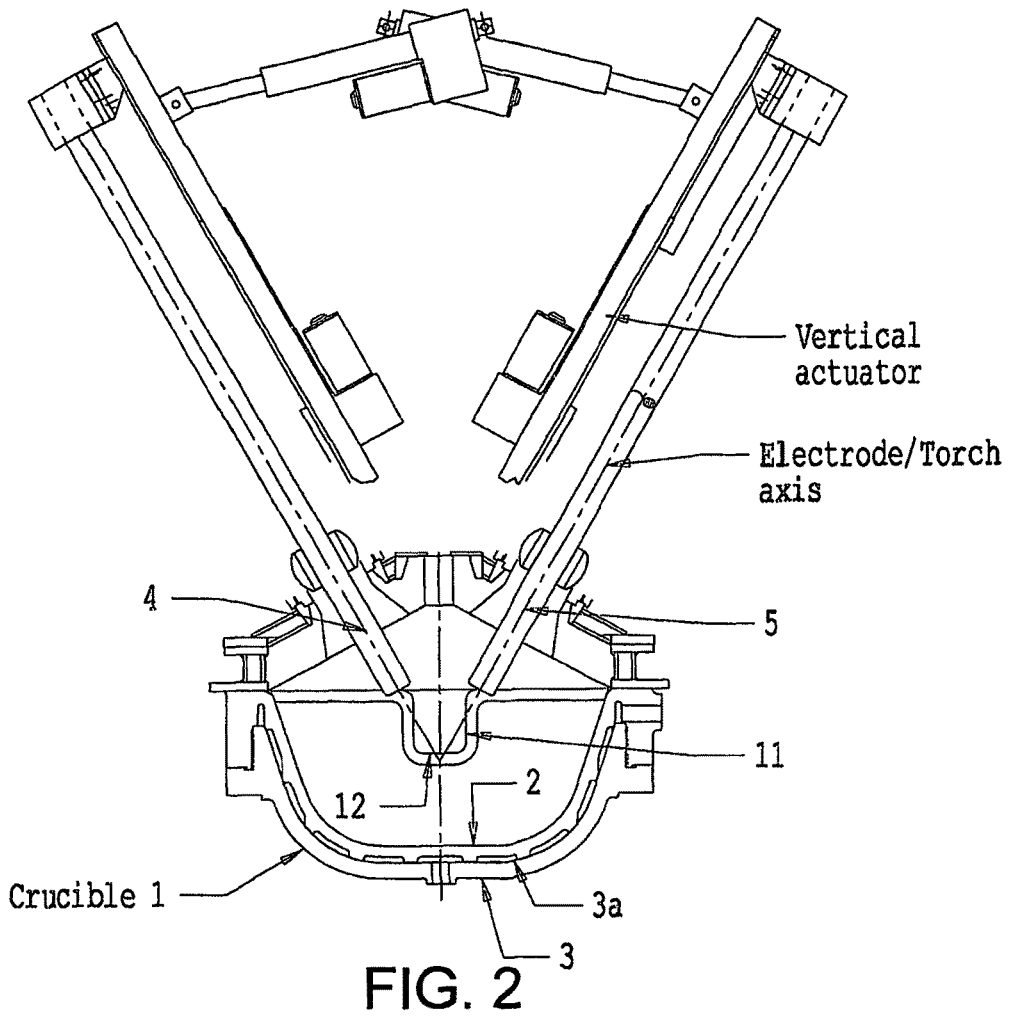
FIG. 2 shows a plasma reactor for use in the method of the present invention, including a crucible, the roof and two plasma device manipulators ("vertical actuators" in diagram) for both vertical and angular manipulation.
Figure 3:
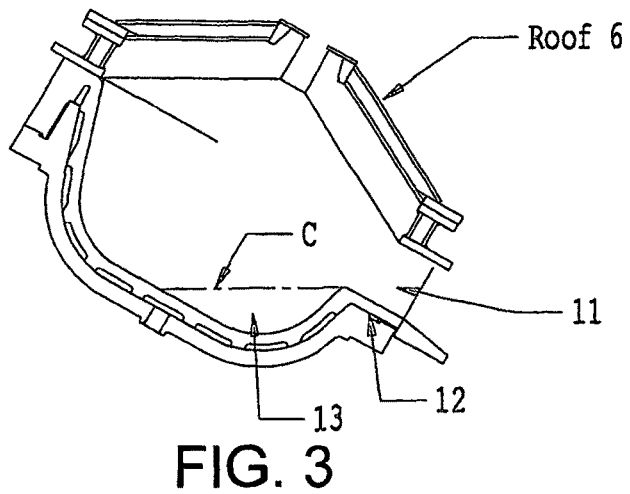
FIG. 3 shows a cross section of the crucible and roof along the dotted line shown in FIG. 2, with molten final wasteform (oxidised hazardous or radioactive waste and host slag material in a combined glassy form) material inside the crucible flowing out of its exit with an intact host slag skull.

A plasma reactor was provided as shown in FIG. 2 having a crucible 1 as shown in FIGS. 1b, 1c and 3. The crucible 1 had an inner wall 2 and an outer wall 3, both formed from cast copper. The external flange diameter A of the crucible was 780 mm. The internal cold crucible diameter B was 600 mm. The melt volume of the crucible was 36 liters and 108 kg of material at a melt density of 3000 kgm$^{-3}$. Between the inner and outer walls 2,3 were water cooling channels 3A for cooling the inner surface of the crucible. The channels ensured positive plug flow of water.

The reactor further comprised one or more plasma torches/electrodes and more preferably two plasma torches/electrode, their longditual axis of location are shown at 4 and 5. The electrodes are manipulated using vertical and horizontal electromechanical actuation. The vertical manipulators alter the vertical height of the electrode within the chamber and the angular manipulators allow for alteration of the included angle between the electrodes. All the manipulation allow for arc length adjustment due to electrode wear and melt height as well as for altering the spatial distribution of the arc during different operational stages.

The roof 6 comprised copper.

Figure 4:
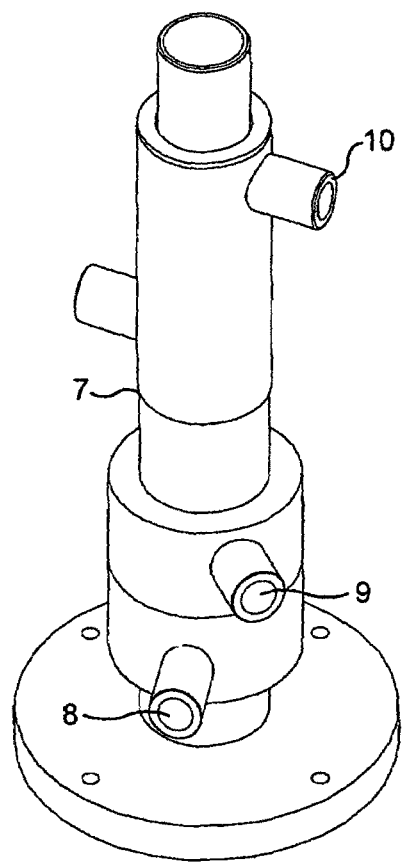
FIG. 4 shows a plenum device having oxygen and steam inlets with a water cooling chamber/jacket. The plenum device permits mixing of the oxidant with the solid waste.

Within the reactor was located a single plenum device 7 having an oxygen inlet 8 and steam inlet 9 (shown in FIG. 4, not shown in FIGS. 1a to 3). The plenum device was mounted on the roof of the reactor in a position diametrically opposed to the off-gas exhaust point. The device 7 further comprised a jacket having an inlet and an outlet for water for cooling the device 7. The inlet and outlets were both connected to the inner water cooling 3A circuit. The plenum device allows mixing of oxygen and steam before they are introduced to the reactor and also allows good oxidant-feed contact, i.e. contact of the waste with the oxidant (oxygen and steam).

The crucible had an exit 11 at one side with a lip 12 extending downwards therefrom. A lower chamber (not shown) is positioned below the exit 11, such that molten host slag material 13 (containing the inorganic waste) during the reaction can flow by gravity out of the exit 11, down the lip 12 and into the lower chamber.

FIGS. 11 and 12 illustrate possible constructions of a plasma reactor having a reaction chamber, which may be an upper chamber as defined above. In these embodiments, the lower chamber (not shown) for collection of the slag material may be displaced below the pouring/tapping spout.

FIG. 11 shows a refractory-lined plasma furnace having a downwardly-extending pouring spout allowing the slag material to be intermittently removed on opening of a valve (not shown) at or near the connection of the spout with the interior of the furnace. The roof contains ports for insertion of the waste and/or host slag material. Plasma torches and/or electrodes may also be inserted through the top of the chamber. Further features shown are a cooling finger, an anode, and water-cooled roof, all of which are known to the skilled person. A number of cooling fingers may be displaced at regular intervals around the interior of the reaction chamber and their purpose is to transmit heat from the refractory material to the exterior of the chamber to aid in keeping the refractory material relatively cool, hence solid. The cooling finger may comprise copper.

FIG. 12 shows a refractory-lined plasma furnace having a continuous overflow spout and graphite containment crucible. The refractory or graphite spout can be seen in the copper spout containment chamber extending upwards at a low incline and then (at the end distal from the crucible) extending vertically downwards. In use, the level of the molten host slag material would typically be in line with (or lower than) the highest point of the spout. If more waste and/or slag is added to the chamber to raise the level of the liquid above the highest point of the spout, this displaces some of the molten slag material through the spout, which can exit the spout to the lower chamber below. Because, in use, the portion of the spout extending from the chamber (below the surface of the host slag material) to the highest point of the spout will be filled with molten host slag material, this prevent air ingress into the chamber, but allows the host slag material to exit the chamber, and obviates the need for a seal (e.g. a valve) on the spout. Other features of the furnace shown in the diagram include feed ports in the roof of the chamber (for waste and/or slag material), a view port with a small keyhole-sized viewing hole, a copper crucible, graphite anodes, all of which are known to the skilled person.

3.2 to 50 kg of a host slag material comprising 43.1 wt % $SiO_2$, 29.2 wt % CaO and 27.7 wt % $Al_2O_3$ was placed in the crucible 1. (On a molar basis, the host slag material contained 47.5 mol % $SiO_2$, 34.5 mol % CaO and 18.0 mol % $Al_2O_3$.)

Then waste was added upto a level of 85% w/w waste loading after the plasma had been initiated and the vessel brought upto temperature, e.g. for the 3.2 kg of host slag 15.97 kg of waste was added, the waste comprising up to 50% w/w organic matter was also placed in the plasma reactor.

The plasma reactor was initiated in a remote-coupled mode, i.e. where the arc is passed between the two torches/electrodes 4 and 5 above the level C of the waste material.

Once the plasma process had been initiated, at 60 to 120 minutes from the initiation, the plasma electrodes were lowered such that they were in direct contact with the host slag material and waste feeding was initiated after the gaseous reactant supplies had been started, bringing the process into a direct-coupled mode. The preheat time is a function of the applied power, vessel size and material loading.

Typical supply levels of gaseous reactant for this experiment were: oxidant [$O_2$ (g)] flow rate was 4.5-6 $Nm^3$ $hr^{-1}$ and 0.5 barg dry steam was 7-8 kg/hr while treating waste at 7.5 kg/hr at 1600° C.

The process was allowed to continue for a period of 5-7 hours in total, i.e. including wasteform condition phases, until the combustible material had been gasified and the inorganic material from the waste and the host slag material had formed a homogenous material that was degassed and uniform. This was allowed to flow into the lower chamber and solidify. The following tests were carried out in the manner described above under the same conditions unless indicated otherwise.

The present inventors found in a first test that when only oxygen was used as the oxidant, a homogeneous ceramic product material formed in the apparatus, with the majority of the hazardous waste components incorporated into the product material. However, it was noticed that some of the metallic components of the waste were not fully oxidised.

In a second test, where the waste further comprised 20 wt % PVC (the slag material being the same as in the first test), and the oxidant was a combination of steam and oxygen as defined previously, it was found that substantially all of the metallic components of the waste susceptible to oxidation were oxidised (due to the oxygen and steam) and incorporated into the ceramic product material. Further, very low concentrations of volatile hazardous components, if any, were detected in the gas phase. The final ceramic product was a non-porous, dense product with relatively few cracks that contained very low levels of residue carbon. Anorthite ($CaAl_2Si_2O_8$) was detected as the predominant major crystalline phase in the product.

In a third test, in which the waste material to be treated contained, inter alia, asbestos, no asbestos was found in the resultant solid product. The resultant solid product was examined using a range of techniques that assess the topographic and bulk crystalline character of the material.

Various quantitative Material Product analyses were undertaken to validate the effectiveness of the plasma process for asbestos vitrification as described below.

The aim of the third test was to establish whether any asbestos minerals were present in the plasma vitrified materials. In all cases a certificate indicating the results was produced in accordance with UKAS accredited procedures.

Temperatures greater than 500-600° C. affect the physical properties of asbestos. Consequently, as the extreme temperatures involved in the plasma vitrification process were likely to render polarised light microscopy (PLM) characterisation techniques such as birefringence and sign of elongation ineffective. X-Ray Diffraction (XRD) was used for bulk crystallographic characterisation and Scanning Electron Microscopy (SEM) for topographic characterisation both analyses carried out at the Institute of Occupational Medicine (IOM) based in Edinburgh Five samples were examined in line with HSG 248 Asbestos (The Analysts' Guide for Sampling, Analysis and Clearance Procedures) which forms the current basis of the UKAS accreditation mentioned above.

Full experimental details of the third test are described below. The resulting homogeneous slag material samples were handled and bagged by a licensed asbestos contractor. All samples were identified for COSHH purposes as plasma vitrified material (EWC 190401).

The third test was carried out as follows:

A Tetronics Plasma Furnace was operated on two separate days. On the first day, the furnace was heated up to 1600° C. from cold, to reach thermal equilibrium, at close to atmospheric pressure, over a period of 1.5 hours. A host slag material, of similar constitution to that used in the subsequent vitrification of Asbestos Containing Material (ACM), was fed continuously into the plasma furnace to flush out residuals from the reactor in order to minimise cross contamination. The host slag material employed, was prepared from virgin reagent materials and designed to have a liquidus temperature of between 1400 and 1450° C. It had the following composition:

| Chemical Formula | Common Name | Weight Percentage |
|---|---|---|
| SiO2 | Silica Sand | 33.7 |
| CaO | Burnt Lime | 58.8 |
| Al2O3 | Bauxite | 3.2 |

The furnace was emptied/tapped via a tap hole using a thermic lance and the tap hole was sealed. A further mass of the host slag material was charged to the furnace to act as a receptor for the ACM waste. A total of 70 kg of host slag material was charged to the furnace and approximately half of it was retained to act as a receptor for the ACM waste and as a return path for the DC plasma circuit. The above operation took place over a period of approximately 5 hours.

The second stage of the third test involved the processing of ACM waste. The material prepared for the trial was certified by a licensed asbestos contractor as being asbestos-containing material. The types of ACM, the amounts and times when they were charged to the plasma furnace are detailed below:

| Time | Mass (kg) | ACM Waste type | Comment |
|---|---|---|---|
| 13:00 | 6.5 | Amosite from vessel insulation. | Material saturated with water |
| 13:40 | 8.0 | Amosite from vessel insulation. | Material saturated with water |

-continued

| Time | Mass (kg) | ACM Waste type | Comment |
|---|---|---|---|
| 14:25 | 7.0 | Amosite from vessel insulation. | Material saturated with water |
| 14:30 | 5.0 | Amosite from pipe work insulation. | Slightly drier material than above |
| 14:50 | 6.0 | Amosite/hrysotile sbestis Insulating Board (AIB). | Dry material, approximately 50 mm square |
| 15:20 | 10.0 | Chrysotile ceiling board debris. | Dry material, approximately 50 mm square |
| Total | 42.5 | | |

The furnace was heated to 1600° C. from cold; at close to atmospheric pressure, over a period of 3.0 hours. Once steady state conditions had been achieved ACM was fed from within a negative pressure tented enclosure in to the furnace.

The working volume of the furnace was 0.075 m$^3$, so with an assumed slag density of 3000 kg/e, 225 kg of slag was required to fill it. Only 130 kg of host slag material was in fact used in this experiment. The ACM waste was charged to the furnace over a period of approximately 2 to 3 hours, then thermally soaked for 50 minutes and finally tapped down in 10 minutes. Five slag samples were taken from the molten slag stream as it exited the furnace.

The plasma furnace performed predictably and accepted all of the different classes of ACM with minimal impact on operational characteristics. The ACM was successfully assimilated into the slag phase to form a final wasteform with an ACM loading of 55% w/w. No plasma outages occurred and the reactor and off-gas system were certified for re-occupation as being asbestos free without cleaning. This indicated that the plasma system was effective in destroying the asbestos polymorphs and that fibre carry-over into the off-gas train did not occur during the process. In combination these observations demonstrates minimal environmental impact.

Optical Microscopy Analysis Methodology

Analysis is initially by ×10 Low Power Stereo Microscopy (LPSM), then detailed examination by PLM to a minimum× 80 magnification. The samples were initially visually assessed to evaluate for consistency of the sample matrix and identify any strata or layers. Each layer within the sample was analysed separately as a sub sample. If the sample appeared homogeneous then sub samples were taken to give a representative analysis.

X-ray diffraction (XRD) Analysis Methodology

Five product slag samples were taken for non-asbestos certification by mineralogical analysis. Portions of each sample were finely ground to create samples of uniform particle size for X-ray diffraction phase analysis. The resultant diffraction patterns were then compared with standard reference materials and search-match indices.

Scanning Electron Microscopy (SEM) Analysis Methodology

Two random product slag samples (numbers 02 and 05) were taken for non-asbestos certification by microstructural analysis. Portions of the two samples were mounted on 25 mm SEM sample stubs, coated with a thin layer of conductive gold and examined by SEM. Energy dispersive X-ray (EDX) analysis was used to indicate the elemental composition of the samples and electronic images of their structure were recorded.

It was found that the product material contained melilite materials, which are silicate materials comprising calcium, aluminium and magnesium due to the treatment of asbestos. Among the melilite materials found were gehlenite, an alumina rich melilite, and akermanite, a magnesium rich melilite. The experiment was repeated 5 times with material from different height locations within the furnace. All product materials from the five tests were found to have the same composition. The Asbestos content was analysed using X-ray diffraction, polarized light microscopy and scanning electron microscopy. No asbestos was detected in any of the five product materials.

Analytical Results

The analysis, conducted in accordance with HSG 248 'Asbestos: The Analysts' Guide for Sampling, Analysis and Clearance Procedures', all indicated the presence of no asbestos.

The XRD traces for all five samples were the same. Most of the material appeared to be crystalline and the diffraction pattern was identified as Akermanite. No peaks were detected in the sample diffraction patterns which corresponded with any of the primary peaks of the original asbestos minerals. An example diffractogram is given in FIG. 6.

SEM analysis found no fibrous components in the samples (see FIG. 7a to FIG. 8b). EDX analysis indicated that the samples comprised calcium, silicon, iron, aluminium and magnesium. The relative proportions of these elements varied depending on the portion of the sample analysed, see FIG. 9, and FIG. 10.

It was noted that the different types of ACM wastes presented to the plasma furnace were visually observed to retain their form for a matter of minutes at 1600° C., as they floated on the molten slag due to density differences. This occurrence was unpredicted as the internal environment of the plasma furnace is extremely demanding and hostile for the majority of materials. This phenomenon was primarily accounted for by the form of the asbestos products, as they are designed to inhibit heat transfer. A secondary reason can be attributed to the ACM waste materials being saturated with water. It is therefore extremely important that control of both residence time and operating temperature are achieved. These conditions must be achieved homogeneously within the treatment vessel and be controlled independently of both process chemistry and ACM product form. In combination these requirements are identified as the unique advantage that the method of the present invention can offer.

The experimentation has demonstrated the thorough way in which ACM can be treated using plasma technology and also the potential for the development of secondary products of 'inert' status which will effectively close the recycling loop.

The resultant slag product has been examined in detail using a range of techniques that assess the topographic and bulk crystalline character of the material. The product has been observed to contain melilite minerals, which are a series of silicate minerals consisting of calcium, aluminium and magnesium; gehlenite is the alumina rich member and akermanite the magnesium rich member. These minerals crystallize from calcium rich, alkaline magmas and from many artificial melts and blast-furnace slags. All five samples appeared to be the same. The crystalline component of the samples was identified by XRD as a melilite mineral and the elemental composition of the samples, as established by EDX analysis, confirmed the elements to be present in the correct proportions to confirm the XRD results. No evidence of asbestos minerals was detected in the samples by PLM, XRD and SEM. No asbestos mineral peaks were detected by XRD and no asbestos fibres were detected by SEM. Therefore the samples are confirmed to contain no Asbestos Minerals.

The above tests show that the method of the present invention is an effective means of converting hazardous waste, including ACM, into a harmless slag product, with the potential for re-use. The technology is robust and unaffected by the different types of ACM used. It is compatible with the working practice defined within the regulations for the removal and packaging of ACM waste for disposal.

The invention claimed is:

1. A method for treating hazardous waste comprising:
providing a plasma reactor comprising a crucible for holding hazardous waste to be treated and a glass-forming host slag material, the crucible having an inner wall having a cooled internal surface;
introducing the glass-forming host slag material into the crucible of the plasma reactor in the absence of the hazardous waste to be treated and treating the glass-forming host slag material in the crucible using a first plasma treatment to melt the glass-forming host slag material while maintaining said cooled inner wall of the crucible below a solidus temperature of the glass-forming host slag material to cause glass-forming host slag material to solidify on said cooled internal surface of the inner wall of the crucible to form a solid interfacial coating of the glass-forming host slag material on said cooled internal surface of the inner wall of the crucible;
introducing the hazardous waste to be treated into the crucible of the plasma reactor after introducing the glass-forming host slag material into the crucible of the plasma reactor, after said melting of the glass-forming host slag material, and after said forming said solid interfacial coating of the glass-forming host slag material on said cooled internal surface of the inner wall of the crucible;
contacting within the crucible of the plasma reactor the hazardous waste to be treated and the glass-forming host slag material; and
treating the hazardous waste to be treated and the glass-forming host slag material in the crucible of the plasma reactor using a second plasma treatment to incorporate inorganic components of the waste to be treated within the glass-forming host slag material;
wherein the plasma is generated using an arc and the arc is passed through the glass-forming host slag material; and
wherein the inner wall of the crucible is maintained at said temperature below the solidus temperature of the glass-forming host slag material during plasma treatment.

2. The method as claimed in claim 1, wherein the glass-forming host slag material is heated to a temperature of 1300 to 1400° C. during the method such that, when molten at this temperature, it has a viscosity of 10 poise or less.

3. The method as claimed in claim 1, wherein the glass-forming host slag material comprises a glass-former selected from $P_2O_5$ and $SiO_2$.

4. The method as claimed in claim 1, wherein the glass-forming host slag material comprises an intermediate oxide selected from $Al_2O_3$, $V_2O_3$, $Bi_2O_3$ and an oxide of the formula $MO_3$, wherein M is a transition metal.

5. The method as claimed in claim 1, wherein the glass-forming host slag material further comprises a network modifier selected from $Na_2O$, $K_2O$, MgO and CaO.

6. The method as claimed in claim 1, wherein the glass-forming host slag material comprises $SiO_2$, $Al_2O_3$ and one or both of MgO and CaO.

7. The method as claimed in claim 1, wherein the glass-forming host slag material comprises a material comprising 30-60 wt % $SiO_2$, 20-35 wt % CaO and 20-40 wt % $Al_2O_3$.

8. The method as claimed in claim 1, wherein an oxidant is present within the plasma reactor.

9. A method as claimed in claim 1, wherein steam is present in the plasma reactor.

10. The method as claimed in claim 1, wherein the internal wall of the crucible is maintained at a temperature below 100° C.

11. The method as claimed in claim 1, wherein the internal wall of the crucible comprises copper.

12. The method as claimed in claim 1, wherein the internal wall of the crucible is refractory lined.

13. The method as claimed in claim 1, wherein the plasma reactor comprises one or more electrodes, preferably two plasma electrodes.

14. The method as claimed in claim 1, wherein the hazardous waste to be treated and the glass-forming host slag material are mechanically agitated during the plasma treatment.

15. The method of claim 1 wherein:
the glass-forming host slag material comprises a material comprising 30-60 wt % $SiO_2$, 20-35 wt % CaO and 20-40 wt % $Al_2O_3$ and having a liquidus temperature between 1100° C. and 1400° C.; and
the treating the glass-forming host slag material in the crucible using the first plasma treatment to melt the glass-forming host slag material comprises heating the host slag material to a temperature at least 100° C. above the liquidus temperature thereof; and
the maintaining the cooled inner wall of the crucible below the solidus temperature of the glass-forming host slag material comprises maintaining the cooled inner wall at a temperature below 100° C.

16. The method of claim 1 wherein the hazardous waste is particularly waste containing harmful substances such as radioactive materials and/or hazardous waste components such as asbestos.

17. The method as claimed in claim 8, wherein the oxidant comprises oxygen.

18. The method as claimed in claim 8, wherein the oxidant is introduced directly into the hazardous waste to be treated and glass-forming host slag material.

19. The method as claimed in claim 13, wherein the plasma electrodes are initiated in a first mode in which an electric arc is passed between the electrodes above the level of the hazardous waste to be treated and the glass-forming host slag material and then operated in a second mode in which an electric arc is passed between the electrodes through the hazardous waste to be treated and glass-forming host slag material.

20. The method as claimed in claim 13, wherein the plasma electrodes comprise graphite.

* * * * *